United States Patent
Griffin

[15] 3,636,450
[45] Jan. 18, 1972

[54] DIGITAL MOS FET CHARACTERISTIC TESTER

[72] Inventor: Ronald G. Griffin, Costa Mesa, Calif.
[73] Assignee: Collins Radio Company, Dallas, Tex.
[22] Filed: Dec. 23, 1969
[21] Appl. No.: 887,692

[52] U.S. Cl. ..................................324/158 T, 324/73 AT
[51] Int. Cl. ...........................................................G01r 31/22
[58] Field of Search .................324/158 T, 158, 73 R, 73 AT

[56] References Cited

UNITED STATES PATENTS

| | | | |
|---|---|---|---|
| 3,235,802 | 2/1966 | Biard et al. | 324/158 |
| 3,094,212 | 6/1963 | Moore et al. | 324/158 T |
| 3,142,382 | 7/1964 | Knowles et al. | 324/158 T |
| 3,323,059 | 5/1967 | Erickson et al. | 324/158 T |

OTHER PUBLICATIONS

Christiansen; D., " Semiconductors: The New Figure of Merit," EEE; October 1965; pages 62– 68.

*Primary Examiner*—Rudolph V. Rolinec
*Assistant Examiner*—Ernest F. Karlsen
*Attorney*—Henry K. Woodward and Robert J. Crawford

[57] ABSTRACT

Apparatus for testing parameters of semiconductor field-effect devices wherein participation of a human operator is minimized. Sequencer and control means selectively interconnects instrumentation to a device under test, test initiation means energizes the instrumentation, and test completion means senses test completion, maintains the parameter reading on monitoring means, and deactuates the instrumentation. The sequencer means may provide automatic sequencing of the test apparatus through the complete testing cycle.

1 Claims, 3 Drawing Figures

INVENTOR.
RONALD G. GRIFFIN

BY  H. K. Woodward

ATTORNEY

DIGITAL MOS FET CHARACTERISTIC TESTER

This invention relates generally to test apparatus, and more particularly to test apparatus for metal oxide semiconductor field-effect transistors (MOSFETS) and like semiconductor devices.

Great strides have been made in the relatively young semiconductor industry in the area of device processing. Not only have device parameters been improved, but also device packaging and processing has introduced large scale integration wherein a relatively large number of circuit functions are provided on a single slice of semiconductor material. Semiconductor devices and integrated circuits have transcended digital application into more demanding linear applications.

A generally well recognized deficiency in the semiconductor industry, though, lies in the area of device testing and checkout. An article in the Oct. 27, 1969 issue of Electronic News emphasizes this acute problem, especially in testing MOS devices. The testing of parameters for field effect transistors and the like is still primarily a manual operation which is both expensive and time consuming. Further, the possibility of introducing an error in device parameter test increases proportionally to the participation of a human operator in the test operation.

An object of the present invention is apparatus which facilitates the testing of semiconductor field-effect devices and the like.

Another object of the invention is test apparatus for semiconductor field-effect devices which performs a series of parameter tests by the selective switching and controlling of analog instrumentation.

Still another object of the invention is test apparatus for semiconductor devices wherein human participation in test operations is reduced.

These and other objects and features of the invention will be more fully understood from the following description and appended claims when taken with the drawings, in which:

Figure 1:
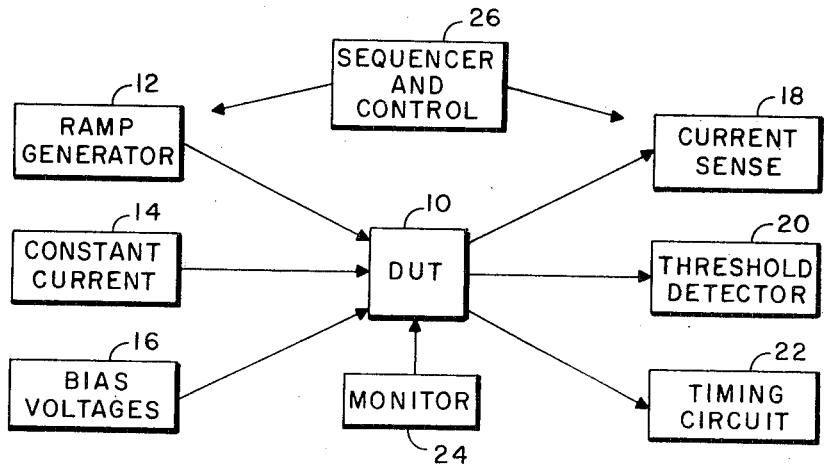
FIG. 1 is a functional block diagram of test apparatus in accordance with the present invention.

The schematic diagrams of FIGS. 2 and 3 will be considered together in the discussion of the apparatus operation given below. Like elements and all drawings have the same reference numerals.

The test apparatus in accordance with the present invention performs a series of parameter tests by selectively switching and controlling analog instrumentation. The analog instrumentation includes a constant current source, a linear ramp voltage generator, a current level sensor, and a voltage level detector. A switching portion of the apparatus includes a diode matrix for selectively energizing relays thereby defining the proper circuit instrumentation necessary in implementing a desired parameter test. A control portion including the voltage level detector readies the various test circuits for the beginning of a test, deactuates the test circuits upon the completion of a test, and maintains the reading on the monitoring means (e.g., digital voltmeter) until recording thereof is completed. Sequencer means may be provided to automatically sequence the test apparatus through the complete testing cycle.

The first device parameter tested is drain to source resistance ($R_{on}$) at a specified drain current and gate to source bias voltage. In this test the constant current source provides the specified drain current to the device under test, and the digital voltmeter will measure $R_d$ as a function of voltage.

Threshold voltage ($V_{ost}$) is measured at a specified drain current and with drain to source voltage equal to gate to source voltage. An increasing negative voltage is applied to the device under test by the ramp generator until the specific drain current is reached. The digital voltmeter records the applied voltage at this point.

Drain-source breakdown voltage ($BV_{dds}$) is measured at a specific drain current level. The ramp generator provides an increasing negative voltage to the drain until the specified drain current is reached, as determined by the threshold detector. The applied voltage at this point is recorded by the digital voltmeter.

Field inversion voltage ($V_{tf}$) is measured for a specific drain current. The ramp generator provides an increasing negative voltage across the gate until a specified current through the gate is reached. The digital voltmeter measures the applied voltage at this point.

Gate to drain and source leakage current ($I_{oss}$) is measured at a specific gate to drain and source bias. Voltage is applied between the gate and the interconnected drain and source, and current is measured from gate to ground.

Drain to source leakage current ($I_{dss}$) is measured at a specific drain voltage with the gate and source connected. Current is measured from source to ground.

The forward voltage drop of the drain-substrate PN-junction ($V_{fwd}$) is measured at a specific drain current. This is an indirect test of contact resistance problems in the device under test.

Referring to FIG. 1, the major components of the test apparatus in accordance with the present invention are illustrated in block form. In measuring the various device parameters described above, the device under test 10 is selectively acted upon by a ramp generator 12, a constant current source 14, and a plurality of bias voltages 16. Currents within the device under test may be monitored by current sensing means 18 and voltages may be detected by a threshold detector 20, alternatively a timing circuit 22 may be utilized to allow the device under test to achieve a steady state prior to the monitoring means 24 indicating a parameter value. Sequencer and control means 26 determines the interconnection of various apparatus elements to effect a particular test.

In the particular embodiment to be described below, the ramp generator function is provided by a Burr-Brown 3138/24 amplifier capable of generating plus or minus 100 volts as a linear voltage ramp output. The current sense means is provided by a Burr-Brown model 3104A/12C amplifier, and the threshold detector is a Raytheon RA709 integrated operational amplifier. The monitoring means is a Hewlett-Packard model 3460B digital voltmeter, and the switching system which controls the test apparatus operation comprises a relay bank and diode matrix.

Figure 2:
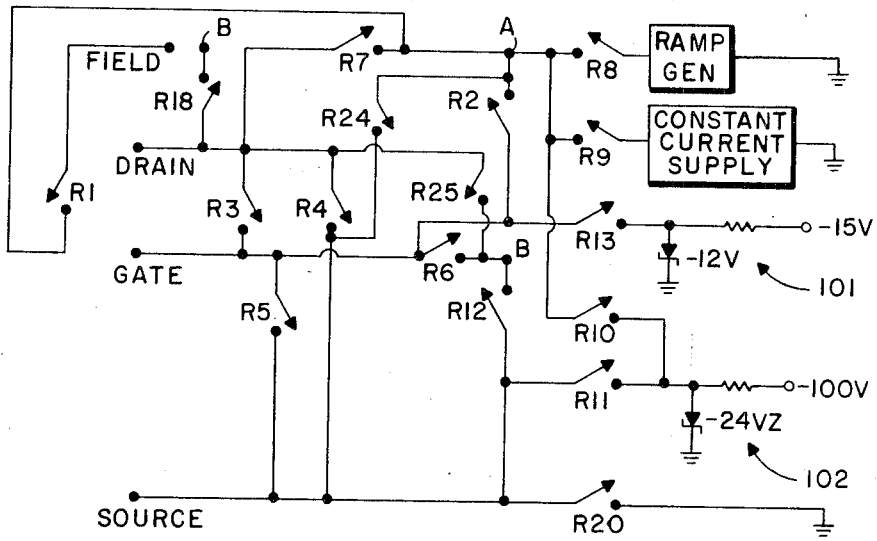
FIG. 2 is a schematic diagram of a portion of test apparatus in accordance with the present invention illustrating interconnections with a device under test.

Referring to FIG. 2, a partial schematic shows the interconnections between the source, gate, drain, and field (substrate) elements of a field-effect transistor device under test and the monitoring points designated A and B, the ramp generator 30, constant current source 32, and reference voltages 34 and 36. The relays interconnecting the various circuit portions will be described below with respect to the various parameter tests.

Figure 3:
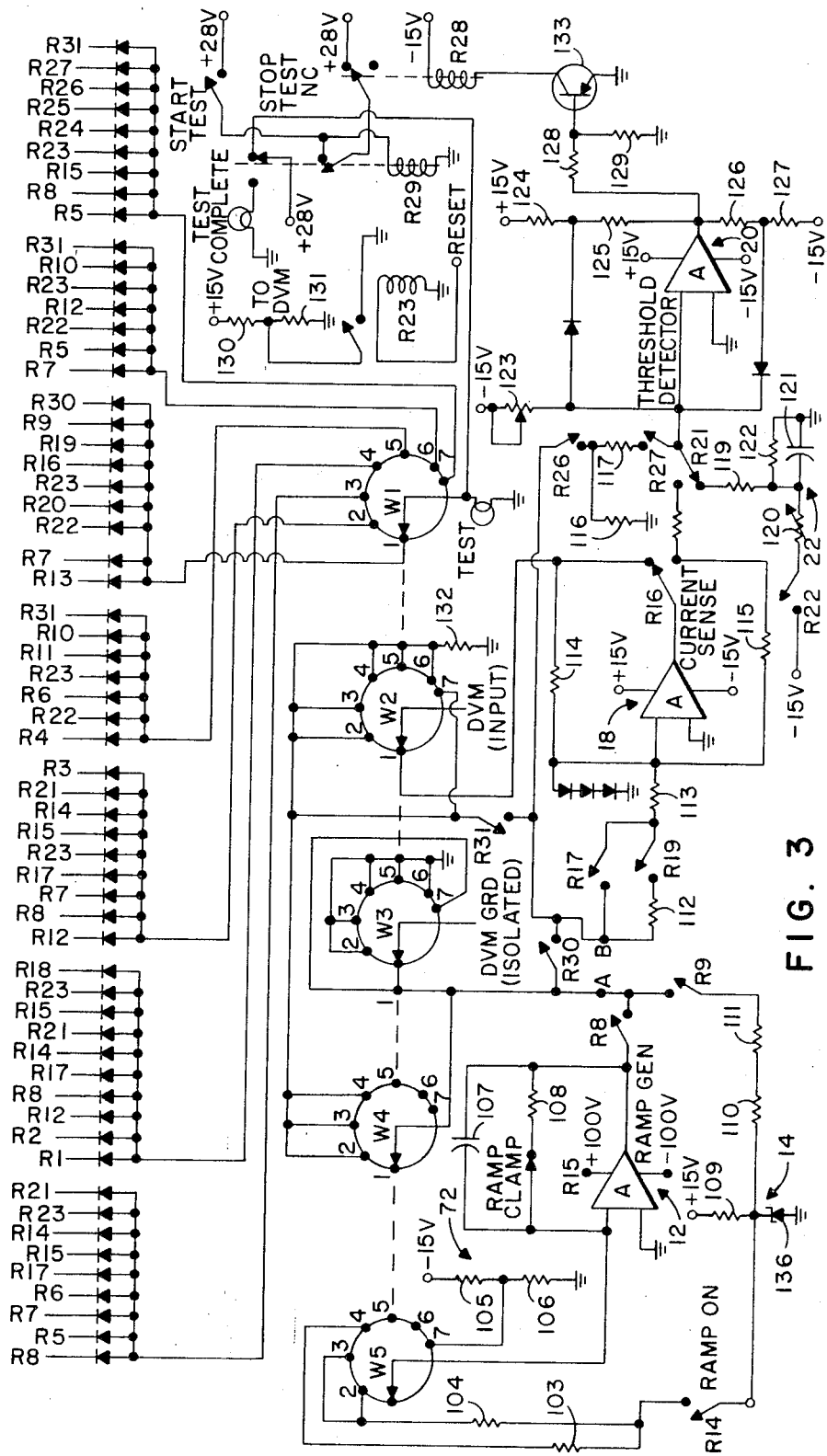
FIG. 3 is a schematic diagram of a major portion of the test apparatus in accordance with the present invention and including the control portion, test initiation, and test completion circuitry.

Consider with the schematic of FIG. 2 the more detailed and complementary schematic illustrated in FIG. 3 which includes the diode matrix which defines the various test sequences, a five-layer wafer switch which may be controlled either manually or automatically to determine the test sequence and monitored parameters, and the test initiation and completion portions of the test apparatus.

The particular test to be employed is determined by the setting of wafer $W_1$, which controls the energization of the diode matrix, and the settings of wafers $W_2$, $W_3$, $W_4$, and $W_5$ which are ganged to wafer $W_1$. A test is initiated by the momentary closing of start test switch button 40 which effects the closing of relay R29. Relay R29 in turn provides a plus 28 volt voltage supply from normally deenergized relay R28 through wafer switch W1 to the diode matrix for any one particular test. A "test on" light 42 is also illuminated with the advent of a test operation. Upon the completion of a test, as determined by the output of threshold detector 20, relay R28 is energized through transistor 44, which is forward biased upon test completion, thus removing the plus 28 volt source from the R28 contact and consequently deenergizing relay R29 and removing the voltage from the diode matrix and the test on signal light 42. Concurrently, a test completion light 46 is energized by the deenergization of relay R29.

Consider now the circuits schematically illustrated in FIGS. 2 and 3 and the parameter tests described above. The test sequence given above will be used in the following description, i.e., drain to source resistance is the first test, threshold voltage is the second test, drain-source breakdown voltage is the third test, field inversion voltage is the fourth test, gate to drain and source leakage current is the fifth test, drain to source leakage current is the sixth test, and the drain-substrate forward voltage drop is the seventh test.

DRAIN TO SOURCE RESISTANCE ($R_{on}$)

With wafer switch W1 in the first position, relays R13, R7, R22, R30, R20, R23, R16, R19, and R9 are energized as indicated by the diode matrix. Before proceeding further, it should be pointed out that all relays are serially connected between the illustrated diode and circuit ground except for relay R15 which is shunted by a small capacitor (e.g., 50 microfarad) with the L-C network delaying deactuation of the relay. The latter relay configuration has proved advantageous as the relay is employed as the ramp generator clamp. Also, all relay contacts are shown in the relay deenergized state.

The first test selection for measuring drain to source resistance connects monitoring point A to the drain through relay R7, the constant current supply to point A through relay R9, points A and B are interconnected by relay R30, the device gate to a minus 12 volts bias through relay R13, the current sense means to monitoring point B through relay R19, the digital voltmeter input (wafer W2) to the current sense output, the resistor-capacitor timing circuit 20 is energized through R22 and connected to the threshold detector, and the digital voltmeter unlock signal relay R23 is energized.

The constant current source, shown generally at 14 and comprising a plus 15 volt source, zener diode 60, resistors 62 and 64, and variable resistor 66, provides 100 microamperes to the device under test, and the digital voltmeter reads the drain to source resistance as a function of voltage drop across resistor 48. Serially connected diodes 50, 52, and 54 function as a clamp to prevent the input to the current sense means from exceeding 2.1 volts. In this embodiment the output of current sense means 18 can go only to 14 volts, therefore the maximum test capability to the digital voltmeter is 14 kilohms. At the end of the RC time constant of the timing circuit 22, the test cycle is completed and the digital voltmeter reading is locked.

THRESHOLD VOLTAGE ($V_{ost}$)

Threshold voltage is next measured with the wafer W2 advanced to the second position. Referring to the diode matrix it will be noted that relays R12, R8, R7, R17, R23, R15, R14, R21, and R3 are energized. Threshold voltage is measured at a drain current of 10 microamperes and with the drain and gate electrodes interconnected. Relay R3 interconnects the gate and drain, relay R7 connects the drain to monitoring point A, relay R8 connects the ramp generator to point A, relay 12 connects the source electrode to monitoring point B, relay 14 energizes the ramp generator through variable resistor 68 and wafer switch W5, relay R15 removes the ramp generator clamp, relay R17 connects current sense means 18 to monitoring point B, relay 21 connects the output of current sense means 18 to threshold detector 20, and relay R23 unlocks the digital voltmeter.

The ramp generator applies an increasingly negative voltage to point A until drain current equals 10 microamperes, as determined by threshold detector 20, whereupon the ramp generator is stopped. The digital voltmeter reading is locked, the ramp generator voltage discharges, and the control circuitry reverts to a ready status.

DRAIN-SOURCE BREAKDOWN VOLTAGE ($BV_{dss}$)

Wafer switch W1 is then advanced to test position 3 for the measurement of drain-source breakdown voltage. Again, as noted from the diode matrix, relays R5, R7, R6, R17, R15, R14, R23, and R21 are energized. The drain-source breakdown voltage is measured at a drain current of 10 microamperes. Relay R5 interconnects the gate and source, relay R7 connects the drain to monitoring point A, relay R8 connects the ramp generator to point A, relay R14 energizes the ramp generator, relay R15 removes the ramp generator clamp, relay R17 connects the current sense means to monitoring point B, relay R6 connects the source to monitoring point B, relay 21 connects the input to threshold detector 20 to the output of current sense means 18, and relay R23 unlocks the digital voltmeter.

The ramp generator provides an increasing negative voltage to point A until the threshold detector receives 1 volt from the current sense means, which represents a drain current of 10 microamperes. The ramp generator is then stopped, the digital voltmeter reading locked, and the ramp generator discharged.

FIELD INVERSION VOLTAGE ($V_{tf}$)

Wafer switch W1 is then advanced to the fourth position to measure field inversion voltage for a drain current of 10 microamperes. The diode matrix energizes relays R1, R2, R12, R8, R17, R14, R21, R15, R23, and R18. Relay R1 connects the field to monitoring point A, relay R2 connects the gate to point A, relay 12 connects the source to point B, relay R8 connects the ramp generator to monitoring point A, relay R14 turns the ramp generator on through a 5 megohm resistor 70 and wafer switch W5, relay R15 removes the ramp generator clamp, relay R17 connects the current sense means to monitoring point B, relay R21 connects the threshold detector to the output of the current sense means, relay R18 connects the drain to point B, and relay R23 unlocks the digital voltmeter.

The ramp generator provides an increasing negative voltage at point A until 10 microamperes through the device under test is reached. The digital voltmeter reading is then locked, the ramp generator is turned off and discharged, and the control circuitry returns to ready status.

GATE LEAKAGE CURRENT ($I_{gss}$)

Wafer switch W1 is next advanced to test position 5 for measurement of gate to drain and source leakage current. For this test the diode matrix energizes relays R4, R22, R6, R23, R11, R10, and R31. The gate to drain and source leakage is measured for a voltage differential between the gate and drain and source of minus 24 volts. Relay R4 interconnects the drain and source, relay 6 connects the gate to point B, relay 11 connects the source to minus 24 volts. Relay 22 energizes the timing means 22 which is connected to the threshold detector 20, relay R10 connects minus 24 volts to point A, relay 23 unlocks the digital voltmeter, and relay R31 connects the digital voltmeter to point B.

The voltage is maintained on the device for the period of time determined by the timing means and the digital voltmeter reads gate current as a function of voltage generated across resistor 48 due to the gate current. After the predetermined test time, the test control returns to standby and the digital voltmeter is locked.

DRAIN TO SOURCE LEAKAGE CURRENT ($I_{dss}$)

Wafer switch W1 is advanced to test position six to measure drain to source leakage current. The diode matrix energizes relays R7, R5, R22, R12, R23, and R10. R5 interconnects the gate and source, R7 connects the drain to point A, relay R10 connects minus 24 volts to point A, relay 12 connects the source to point B, relay R22 energizes the timing means 22, and the opening of relay contact R23 unlocks the digital voltmeter.

At the end of the test period as determined by the timing means, the current in the resistor 48 is read as a voltage by the digital voltmeter, and the control circuit returns to ready with the digital voltmeter reading locked.

FORWARD VOLTAGE DROP ($V_{fwd}$)

Wafer W1 is advanced to test position seven to measure the forward voltage drop of the drain-substrate PN-junction. The diode matrix energizes relays R5, R8, R15, R23, R24, R25, R26, R27, and R31. Relay R5 connects the gate to source, relay R8 connects the ramp generator to point A, wafer switch W5 energizes the ramp generator from voltage divider 72, relay R15 removes the ramp generator clamp, relay R24 connects the source to point A, relay R25 connects the drain to point B, relay R26 provides a bypass to current sense means 18, relay R27 connects the threshold detector to point B through series resistor 56, relay R1 connects the substrate to point A, and relay R31 connects the voltmeter to point B. Shunt resistor 58 in combination with series resistor 56 provides a voltage divider which functions to adjust the threshold detector input as required in calibration.

The ramp generator makes point A increasingly positive with the substrate connected to point A. The threshold detector stops the test when the drain current equals 10 milliamperes, thereupon the digital voltmeter is locked and the control circuitry is returned to standby status.

In a specific embodiment of the illustrative apparatus the following component values (in ohms and microfarads) were used:

| | |
|---|---|
| 101 | 300 |
| 102 | 7.5K |
| 103 | 5M |
| 104 | 0-2M |
| 105 | 5K |
| 106 | 10K |
| 107 | 1 |
| 108 | 10K |
| 109 | 500 |
| 110 | 100K |
| 111 | 0-2K |
| 112 | 100K |
| 113 | 10K |
| 114 | 1.39M |
| 115 | 91K |
| 116 | 91K |
| 117 | 100 |
| 118 | 100K |
| 119 | 220K |
| 120 | 100K |
| 121 | 50 |
| 122 | 122 |
| 123 | 1M |
| 124 | 15K |
| 125 | 10K |
| 126 | 3K |
| 127 | 15K |
| 128 | 10K |
| 129 | 5K |
| 130 | 10K |
| 131 | 3K |
| 132 | 1M |
| 133 | 2N2907-A |
| 134 | 8V Zener |
| 135 | 9V Zener |
| 136 | 10V Zener |
| 137 | 50 |
| 138 | 200 |
| 139 | 1N4002 |
| 140 | 1N4002 |
| 141 | 1N4002 |

All unmarked diodes are 1N4002.

While the invention has been described with reference to a specific embodiment, the description is illustrative and is not to be construed as limiting the scope of the invention. Various modifications and changes may occur to those skilled in the art without departing from the spirit and scope of the invention as defined by the appended claims.

I claim:

1. Apparatus for measuring parameters of semiconductor field-effect devices comprising:
   a. ramp voltage generator means for generating a variable device test voltage for dynamic testing,
   b. constant current means,
   c. bias voltage means,
   d. current sense means,
   e. threshold voltage detector means cooperatively functioning with said ramp voltage generator means for sensing a completed test and controlling said ramp generator means,
   f. timing means,
   g. monitoring means,
   h. control means for selectively interconnecting the functional means (a) through (g) and a device under test for measuring specific device parameters including drain to source resistance, threshold voltage, drain-source breakdown voltage, field inversion voltage, drain and source leakage, drain to substrate leakage current, and drain-substrate forward voltage drop; said control means including a plurality of switch means and a diode matrix for selectively closing said switch means,
   i. sequencer means cooperatively functioning with said control means for determining the specific device parameter to be measured,
   j. test initiation means for said functional means, and
   k. test completion means for deenergizing said functional means upon completion of a parameter measurement.

* * * * *